Dec. 12, 1967  R. A. GULICK  3,357,679
MULTI-MATERIAL ELASTOMER SEAL
Filed Oct. 31, 1963  3 Sheets-Sheet 1

INVENTOR.
RONALD A. GULICK
BY
AGENT

Dec. 12, 1967  R. A. GULICK  3,357,679
MULTI-MATERIAL ELASTOMER SEAL
Filed Oct. 31, 1963  3 Sheets-Sheet 2

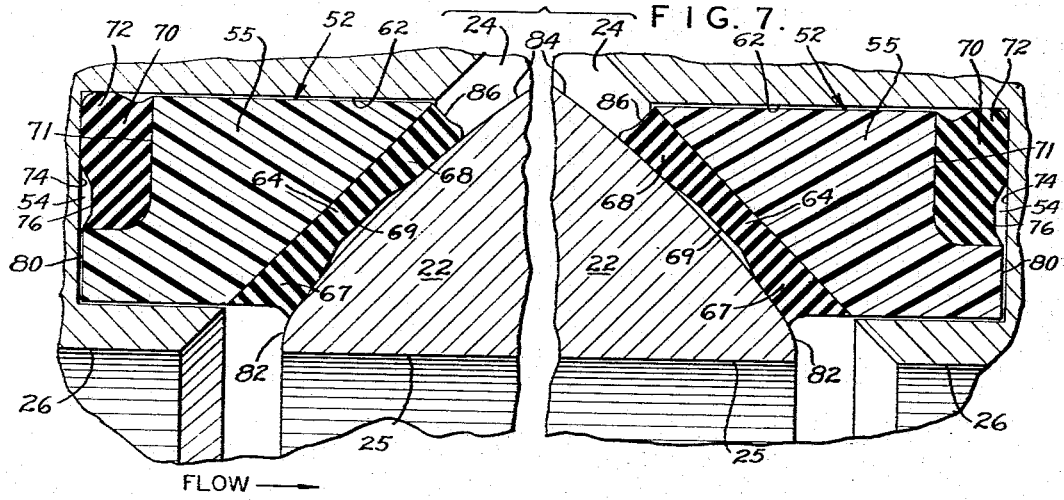
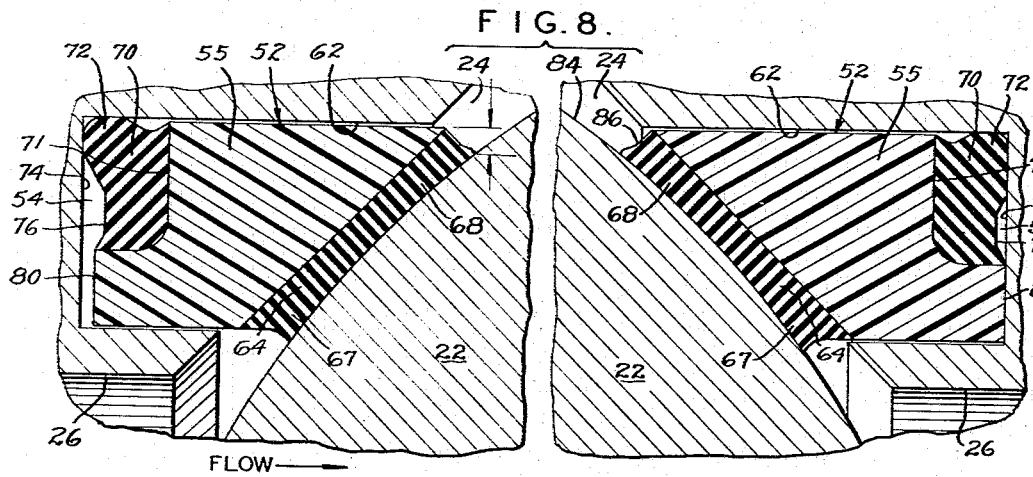
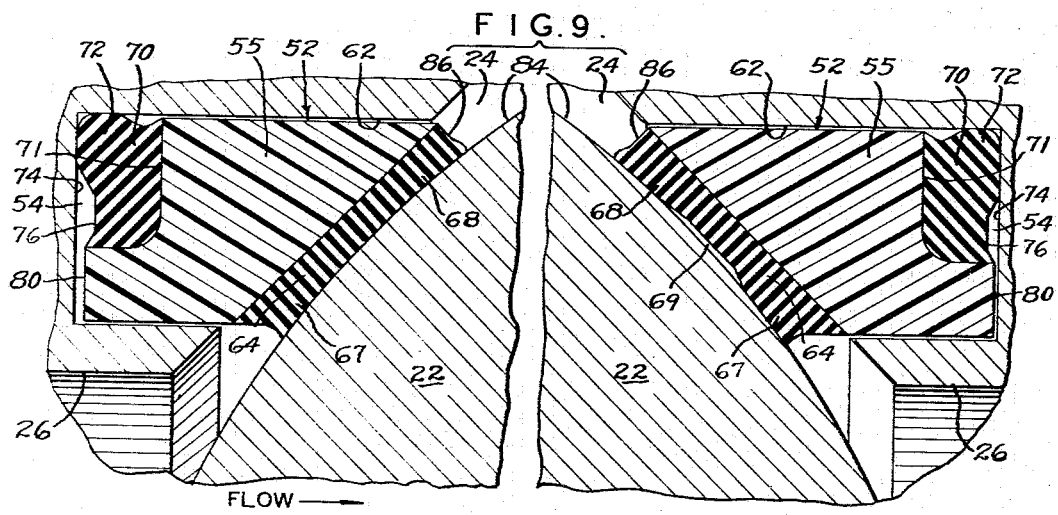

United States Patent Office 3,357,679
Patented Dec. 12, 1967

3,357,679
MULTI-MATERIAL ELASTOMER SEAL
Ronald A. Gulick, Sugar Land, Tex., assignor to ACF Industries, Incorporated, New York, N.Y., a corporation of New Jersey
Filed Oct. 31, 1963, Ser. No. 320,477
10 Claims. (Cl. 251—172)

This invention relates to valves in general, and in particular to spherical plug valves, generally known in the industry as ball valves, and more specifically to pressure actuated sealing elements which may be employed with either floating or trunnioned ball valves.

Valves of the spherical plug type have heretofore been constructed with the seats conforming to the spherical plug or ball. This type of construction resulted in large areas or planes of contact producing high loads and subsequent high torques from very high accumulation of tolerances in the plug-body-seal assembly. Attempts to place sealing means within the body to prevent leakage past these seats has required the provision of extremely complicated arrangements to retain the sealing means in position. Also, most of these valves have been incapable of controlling leakage in the upstream as well as downstream direction, thereby limiting utilization of the valve to one of simple flow control in which the body of the valve is always pressurized regardless from which side pressure is applied.

Utilization, in high pressure valves of this type, of a seal member composed of an elastomer material, has been retarded in the past due to the inherent disadvantageous properties of an elastomer material. A soft elastomer sealing material provides a good seal due to its inherent ability to conform to the surface of the plug, but when utilized in a high pressure system, it deforms excessively and allows excessive plug movement, thus eliminating the possibility of achieving a proper upstream seal as well as resulting in unnecessarily high torque to turn the valve. An elastomer sealing element which is hard enough to limit valve movement sufficiently to effect an upstream seal quite naturally does not lend itself to efficient sealing because of the limited amount of elastomer deformation.

When utilized in valves for conducting high pressure ladings, an elastomer seal because it lacks body strength will occasionally be pulled into the line by the line pressure and blown completely out of its seat or it may deform into the bore of the valve in a position to be engaged and sheared by the spherical plug upon turning thereof. To eliminate the tendency of an elastomer seal to be blown out of its seat or to be sheared by the plug, pressure bypasses and vent openings have been provided to reduce the effect of line pressure. Boring bypasses and vent openings obviously results in higher valve fabrication costs and reduces the competitiveness of the end product.

At present newer hydrocarbon sealing materials have been developed which are hard enough to prevent excessive ball movement and which lend themselves to effective sealing, but these materials generally are extremely expensive, thus increasing valve costs, and are difficult to bond to the valve elements, therefore, limiting the design of the sealing members. It is, therefore, an object of this invention to provide a novel free floating spherical plug valve which includes an elastomer sealing element which will produce an effective seal without allowing excessive lateral movement of the plug member.

It is a further object of this invention to provide a novel plug valve employing an elastomer sealing member which simultaneously produces an effective upstream and downstream seal.

Another object of this invention includes the provision of a novel plug valve wherein the valve chamber, while the valve is closed and pressure is on the line, may be bled to indicate leakage past either of the seat members.

It is a further object of this invention to provide a novel plug valve having seat members which will relieve over-pressure of the valve chamber to the upstream line.

A further object of this invention contemplates the provision of a novel plug valve wherein the seat members are pressure actuated and may be employed with either a floating or trunnioned plug member.

It is a further object of this invention to provide a novel plug valve employing an elastomer sealing member which produces an effective seal at both low and high line pressures while keeping turning torque at a minimum.

An object of this invention contemplates the provision of a novel plug valve employing seat members having elastomer sealing surfaces which are soft enough to establish an efficient seal and the seat members being rigid enough to prevent line pressure deformation of the seat member into the bore where it might be sheared upon turning of the valve.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIGURES 7 and 8 are operational sectional views of the valve of FIGURE 1, illustrating operation of the face and back face seals during various phases of valve operation.

FIGURE 9 is an operational view illustrating operation of the seat members of this invention in a trunnioned plug valve.

Briefly, the invention comprises a valve body formed with flow passages and a valve chamber. A plug member is positioned in the valve chamber for rotation from an open position, where fluid from the flow passages is allowed to flow through a bore in the valve, to a closed position blocking the flow of fluid. Valve seat members are retained in annular seat recesses formed in the valve body and include a face sealing element in engagement with the valve member at all times and at all conditions of valve operation. The seat member also includes a back face sealing member which is in sealing engagement at all times with an outer cylindrical wall of its respective recess. The construction of the sealing elements is such that line pressure seeping behind the seat member will actuate the upstream seat member in a piston-like manner and cause the upstream seat to move laterally into tighter sealing engagement with the plug member. As the line pressure rises the piston-like action of the upstream seat will cause higher contacting pressure between the seat and plug. If the plug member is not trunnioned, line pressure will force the plug member laterally into sealing engagement with the downstream seat. Therefore, an upstream seal as well as a downstream seal is provided when a free floating plug valve is in its closed position. If the flow of fluid through the valve is reversed, the plug member will be forced again against what would now be the downstream seat, while the upstream seat will be pressure actuated into sealing engagement as described hereinabove. If the plug is trunnioned, the plug obviously would not be shifted into engagement with the downstream seat and, therefore, only an upstream seal would be effected. Rotational movement of the plug member is effected by a valve stem extending through a bonnet member which may be rotated manually, electrically, mechanically, or in any other manner without altering the spirit or scope of this invention.

Figure 1:
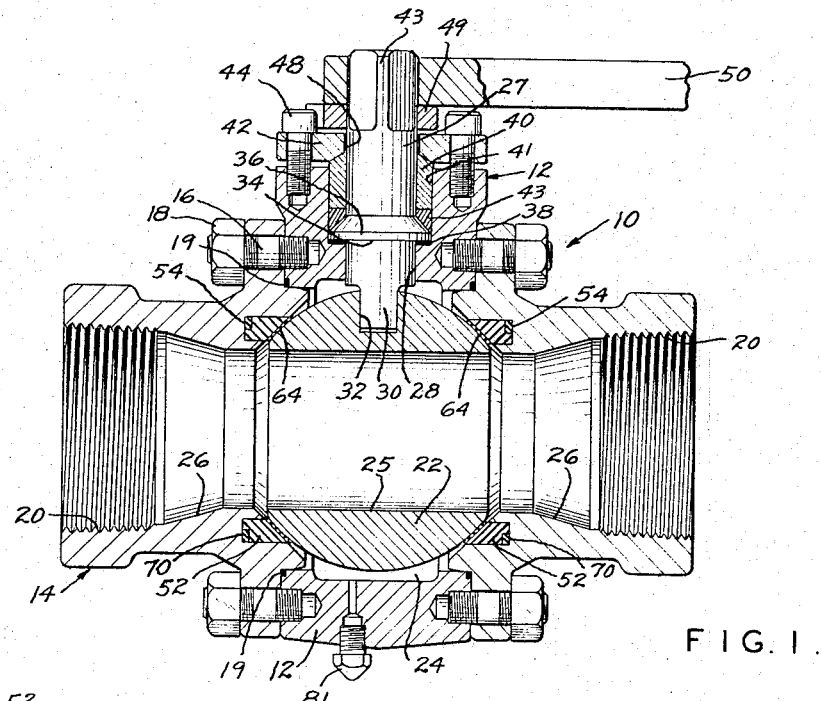
FIGURE 1 is an elevation view in section of a plug valve embodying sealing means in accordance with the present invention.
Figure 2:
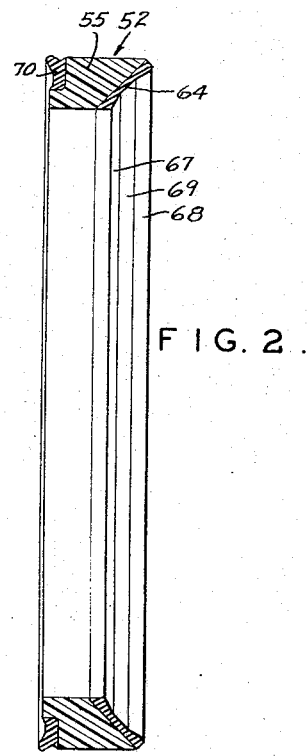
FIGURE 2 is an enlarged vertical section illustrating one of the seat members of the valve of FIGURE 1 in accordance with the present invention.

Referring now to the drawings for a better understanding of the invention, the valve 10 consists of a generally tubular body portion 12 to which end closure members 14 are attached by means of studs 16 threaded into the body 12 and maintained in engagement by nuts 18. Annular seal members 19, which may be in the form of an O-ring formed of resilient sealing material, are retained by the end closure members 14 in an annular groove formed in the body member 12 to provide a seal between the body member 12 and the end closure members 14. The end closure members 14 may be internally threaded as illustrated at 20 in FIGURE 1 for attachment of the valve into a piping system. Obviously the end closure members 14 may be provided with flanges for bolting the valve into a piping system or the valve may be welded or otherwise attached into a piping system without altering the concept of this invention. A generally spherical plug member 22 is positioned within a valve chamber 24 defined by the tubular body portion 12 and the end closure members 14. The plug member 22 is provided with a spherical outer surface 84 and a through passage 25 for alignment with flow passages 26 formed in the end closure members 14. A plug operating stem 27 extends through a stem aperture 28 formed in the body member 12 and a noncircular portion 30 at the lower extremity of the stem 26 extends into a mating noncircular recess 32 formed in the plug member 22. Construction of the recess 32 in the plug member and the noncircular portion 30 of the stem is such that the stem will not rotate within the recess and that rotation of the stem 27 will induce rotation of the plug member 22. A shoulder 34 on stem 27 is defined by a flange 36 and engages a stem gasket 38 interposed between the shoulder 34 and the body 12 to limit axial inward movement of the valve operating stem 27 and to provide sealing between the body 12 and the shoulder 34 as well as reducing the torque in stem turning. An annular compression ring 40 is positioned within a packing chamber 41 and bears against the upper surface of a packing member 43 of sealing material positioned about the stem 27. The annular packing member 43 is maintained under pressure by an adjustable bonnet member 42, which is affixed to the valve body 12 by adjustable screw members 44 and which bears against the compression ring 40 to obtain a seal between the valve body 12 and the stem 27 and to retain the stem in position. An aperture 48 is provided in the bonnet member 42 through which the upper portion of the valve operating stem 27 extends. The upper portion 43 of operating stem 27 is formed with a noncircular portion to receive a stop plate 49 for limiting rotational movement of the plug member 22 from a fully closed position to a fully open position, and to also receive a handle means 50 for manual operation of the valve 10. Various other means of valve stem operation such as electrical, mechanical, or hydraulic, for example, may be employed without departing from the concept of this invention.

In accordance with a feature of this invention, separate seat members generally indicated at 52 in FIGURES 1-6 are slidingly received by an annular groove 54 defined in each of the end closure members 14. Each of the seat members 52 is comprised of a relatively rigid annular support member 55 (FIGS. 2-6), having inside 56 and outside 58 circumferential walls adapted for sliding engagement respectively with the inside 60 and outside 62 circumferential walls of the recess 54. The support member 55 of the seat 52 may be formed of appropriate rigid plastic materials such as those of the Phenol-Formaldehyde group, for example, or it may be formed of metals such as bronze, steel, etc., depending upon the pressures for which the valve is designed. A thin elastomer face sealing element 64, which may be approximately ⅛ to ⅒ as thick as the total axial length of the seat 52, for example, and which may be composed of natural rubber, or of various well known synthetic rubber like materials, such as butadiene rubber, styrene, neoprene, silicone rubber, etc., is fixed to an annular surface 66 on the seat member 52 by bonding or the like. Inside 67 and outside 68 radially spaced annular deformable sealing lip members are provided integral with the elastomer face seal element 64 to effect inside and outside circular reduced area seals when in light contact with the spherical plug member 22 as illustrated in FIGURE 7. A depressed frusto-conical surface 69 of each of the seats 64 is disposed between the inner and outer sealing lips 67 and 68 and is adapted to contact the surface 84 of the plug member 22 when line pressures reach a predetermined higher level. For example, a valve utilizing this invention has been designed to operate from 0 to 100 p.s.i. of line pressure with the face seal engagement with the plug being at its reduced condition (FIGURE 7), in which only the lip portions 67 and 68 form the seal between the plug 22 and the seat member 52. At pressures above 100 p.s.i. of line pressure the soft elastomer lip members 67 and 68 will be compressed by the surface 84 of the plug 22 to force the surface 69 also into contact with the surface 84 of the plug, which greatly enlarges the seal contact area and increases the pressure sealing capability of the seat. Using the principles of this invention, the same seats of a plug valve may thus be employed to give an effective seal from 0 to 5000 p.s.i. of line pressure or greater. It should be noted that neither the relative thicknesses of the seal members 64 nor the operating pressures of the valve, set forth above, are meant to be taken in a limiting sense.

Figure 3:
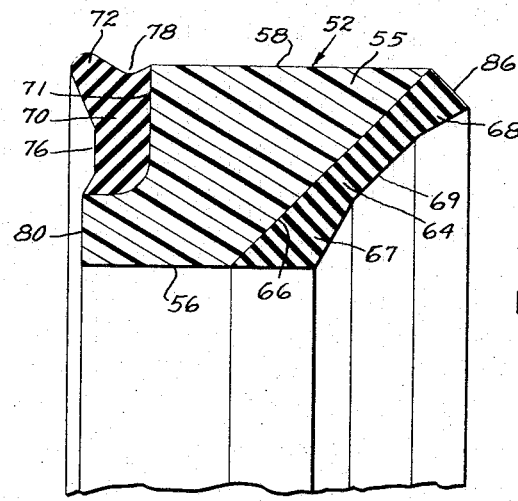
FIGURE 3 is a partial vertical section of FIGURE 2, illustrating the seat member and enlarged to show the face and back face sealing means in greater detail.

In accordance with another feature of this invention, an annular back face sealing element 70, FIGURES 2-6, formed of one of the elastomer materials indicated above, is fitted within an annular groove 71 formed in the support member 55 and is fixed to the support member 55 by means of bonding or the like. An annular sealing lip portion 72 of the back face seal 70 is formed to extend beyond the radial and axial limits of the rigid ring member 55, as illustrated in FIGURE 3. When the seat members 52 are positioned in the annular recess 54 (FIGS. 4-6), the annular back face sealing lip 72 of each seat will be maintained under radial compression by the outer circumferential wall 62 of the recess 54, thereby effecting a seal against the outer circumferential wall 62. Because the total uncompressed axial length of the sealing elements 70 and 64 of the two sealing rings 52 and the plug member 22 is greater than the combined axial length of the valve chamber 24 and the annular grooves 54, when the valve is assembled, the face sealing elements 64 and the back face sealing elements 70 will be slightly compressed axially as well as radially. The sealing lips 67 and 68 under this condition will lightly and sealingly engage the surface 84 of the plug and the depressed surface area 69 of the sealing member 64 will be out of contact with the plug member thus establishing the two separate ring-like areas of sealing contact described above. Since the area of contact between the lip members 67 and 68 is relatively small, the sealing contact pressure established at these reduced areas will be higher than if a larger sealing surface were utilized at low pressure.

The back face sealing member 70 (FIGURE 3) is formed with a radial depression 76 and an axial depression 78, which limit the volume of the back face seal 70 to an amount less than the volume of the groove 71 in which it is bonded. When the downstream seat member 52 is shifted a maximum amount, the surface 80 of the seat 52 will contact the surface 74 of the corresponding groove or recess 54, thus compressing the back face sealing lip 72 entirely into the groove 71 as illustrated in FIGURE 8 (right). Since the back face seal 70 is formed of an elastomer, it will readily flow into the groove 71. When the surface of the relatively rigid member 55 contacts the wall 74 of the recess 54, the seat 52 is arrested against further movement and supports the plug member 22 against further axial movement.

When the seat member 52 is employed as an upstream seat (FIGURE 8-left), fluid under line pressure will seep into the recess 54 and apply a force against the radial surface 80 of the rigid 55 member and the radial surface of the back face seal, thereby forcing the seat member 52 axially toward the plug member 22 in a piston-like manner to achieve intimate sealing contact between the lip members 67 and 68 and the plug member 22. The sealing lip 72, of the back face seal 70, when employed as an upstream seal, will be moved by fluid under line pressure into tighter sealing engagement with the circumferential wall 62, preventing fluid from flowing past the seat member 52 and into the valve chamber 24. This feature is generally known in the field as being pressure actuated or pressure acting.

In accordance with another feature of this invention, a safety feature is incorporated in this invention and relieves any excessive build up of pressure within the valve chamber 24. This condition might occur when volatile ladings are being handled under high ambient temperatures, hot conditions or in case of high temperatures, caused by a fire. When volatile ladings such as gasoline, butane, propane or even more exotic petroleum products or chemical products are handled under high ambient temperatures, the fluid which has leaked past the seats 52 into the valve chamber 24 of the valve 10 will vaporize causing a dangerous increase in body pressure. If the body pressure is not relieved, it could increase to a high enough level to cause severe damage to the valve and could possibly rupture the valve body or blow the bonnet assembly 14 from the valve body 12. The annular seal established between the outer face sealing lip 68 and the surface 84 of the plug member is radially smaller than the annular seal between the back face sealing lip 72 and the circumferential wall 62 of the recess by a distance indicated by facing arrows in FIGURE 8 and defining an annular surface 86 of the face seal member 64. As pressure in the valve chamber of a valve, employing seat members in accordance with this invention, increases above line pressure as indicated above, the increased body pressure will act against the annular surface 86 of the face seal and will force the upstream seat in an upstream direction and allow the pressure to escape between the face seal and the plug into the upstream line. To relieve over pressure of the body, the upstream seat needs only to move slightly thus allowing pressure to seep between the face seal and the surface 84 of the plug and into the upstream line.

Turning torque, or the resistance of the plug member 22 and the stem 27 against a force applied to the operating handle 50, is also minimized by this invention as compared to valves having seat members formed entirely of elastomer materials. As fluid under pressure forces the plug member of a valve utilizing total elastomer seats into high sealing engagement the elastomer seats will distort considerably both axially and laterally and the face seal area in contact with the plug 22 will increase to a large amount. Since turning torque is partly controlled by the amount of surface area engagement between the plug and the seat member, it is obvious that a large surface contact area which would be established by an elastomer seat would result in a large turning torque. Since the elastomer portion 64, of the seats 52 of a plug valve in accordance with this invention are thin and are supported by the rigid portions 55 of the seats 52, they will distort only slightly and, therefore, only a slight surface contact area increase would be effected. The resultant turning torque would be considerably less than the turning torque effected by seat members composed entirely of an elastomer material under similar pressure conditions.

Figure 4:
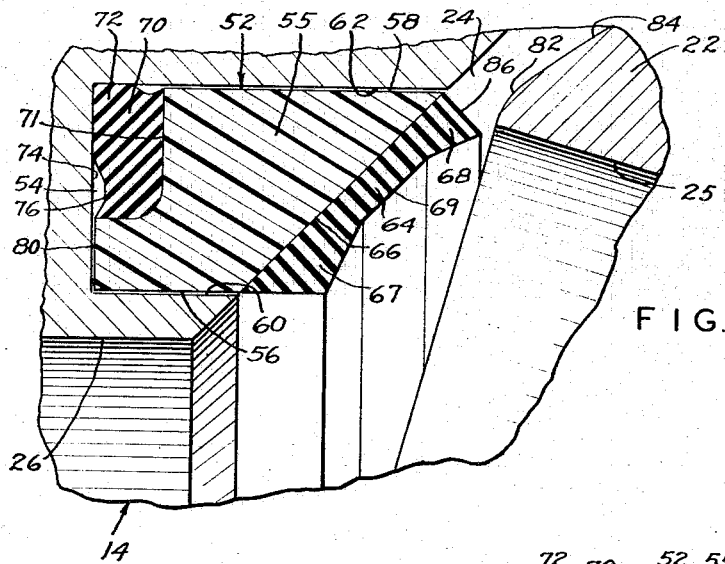
FIGURES 4, 5 and 6 are partial vertical sections of one of the seat members of FIGURE 1, illustrating the operation of the sealing elements during rotation of the plug member.
Figure 5:
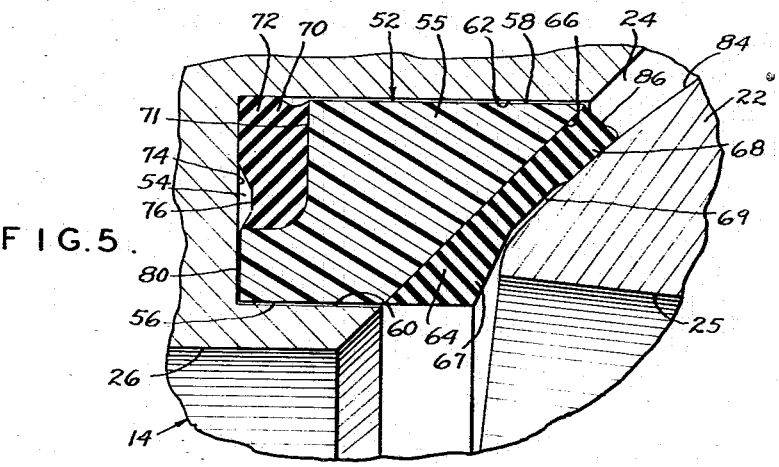
Figure 6:
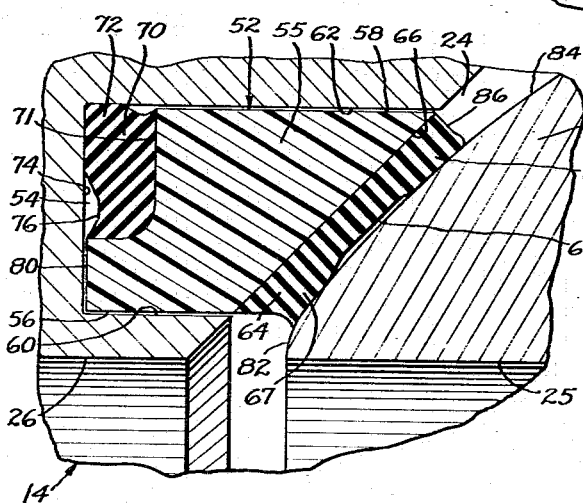

FIGURES 4-6 also illustrate the relationship between the plug 22 and the seat member 52 as the valve is rotated from a closed to an open position. A cam surface 82 is formed on the valve member 22 by transitioning the curvature of the spherical surface 84 of the plug 22 to a greater curvature at the intersection of the bore 25 with the spherical surface 84 of the plug 22 so that the intersection of the cam surface 82 with the bore 25 of the plug member 22 is generally perpendicular. As illustrated in FIGURE 4, the cam surface 82 engages the sealing lip 68 in such a manner that continued rotation (FIGURE 5) of the plug 22 cams the lip member generally axially. When the plug member is fully open (FIG. 6) the elastomer material of the inner and outer lips 67 and 68 respectively of the seat member 52 have been cammed outwardly and lightly and sealingly engage the plug member while the depressed surface 69 remains spaced from the surface 84 of the plug 22. The cam surface 82 described above, therefore, prevents shearing of the elastomer material which would occur upon opening or closing of the plug member 22.

Operation of the seat members 52 of both the trunnioned and free floating type plug valves in the open position of the valve is essentially the same. As illustrated in FIGURE 7, both the upstream and downstream seats 52 are in their balanced and lightly compressed condition because pressure in the line and in the valve chamber is equal or nearly equal. The plug will be centrally located and both seats will lightly engage the surface 82 of the plug 22 in the same manner as if the valve were not under pressure. The back face seals 70 will have the sealing member 72 thereof in light sealing engagement with both the back face surface 74 and the circumferential surface 62 of the recess 54.

FIGURE 8 illustrates the action of the upstream and downstream seals 52 in a free floating plug valve when the plug is in its closed position and under high line pressure. Line pressure will force the plug member 22 downstream and the surface 84 of the plug 22 will compress the face seal 64 of the downstream seat (right) thus distorting the sealing lips 67 and 68. The downstream seat will be forced into its seat recess and the surface 80 of the seat will contact the surface 74 of the recess 54 to stop the plug 22 from moving further. Under low line pressures the back face seal element 70 alone will provide axial support for the plug member and neither the face seal 64 nor the back face seal 70 will be compressed to their maximum limit. The upstream seat (left) FIGURE 8, will be pressure actuated into sealing engagement with the plug member 22. Fluid under line pressure will flow between the surface of the back face portion of the seat member 52 and the surface 74 of the seat recess and a force differential, resulting from a greater exposed back face area than an exposed face seal area, causes the seat to move downstream into constact with the plug 22 in a piston-like manner. At low line pressures the sealing lips 67 and 68 of the face seal 64 will be deformed slightly and the depressed central surface 69 of the face seal 64 will not contact the surface 82 of the plug 22. As line pressures increase, the annular sealing lips 67 and 68 will deform further and the depressed surface 69 will be forced into sealing contact with the plug. The relatively rigid annular portion 55 of the seat members 52 structurally support the valve member 22 against excessive lateral movement, as well as providing a yieldable sealing surface for effective sealing at both low and high line pressures. As the surface 80 of the annular support member 55 is forced into contact with the surface 74 of the recess 54 movement of the plug member substantially ceases because of the rigidity of the support member 55 with further plug movement resulting in the compression of the face sealing portion 64 of the seat 55. Since the annular face seal 64, encompassed by the sealing lips 67 and 68 and the depressed surface 69, is thin, it will compress very little in relation to the total axial length of the seat member 52. Therefore, when the total surface of the face seal 64, defined by the sealing lips 67 and 68 and the depressed surface 69, is in sealing contact with the surface 82 of the plug, distortion and compression of the face seal portion 64 will be very near its maximum limit.

As illustrated in FIGURE 8, the sealing member 72 of the back face seal 70 of the upstream seat (left) will be pressure actuated toward the circumferential wall 62 of the seat recess 54 to establish a tighter seal. It should be noted that the sealing member 72 is normally in sealing engagement with the circumferential wall 62 because it was radially compressed when the seat 52 is inserted into the recess 54. Pressure actuation, therefore, merely tightens the sealing engagement already established between the back face sealing member 72 and the circumferential wall 62.

FIGURE 9 illustrates the action of the upstream and downstream seats when seat members in accordance with this invention are utilized in a trunnioned plug valve. It should be noted that the plug will not float downstream to force the downstream seat into sealing engagement as occurs in the free floating nontrunnioned type plug valve. As illustrated in FIGURE 9, the upstream seat will function in a trunnioned plug valve in the same manner as in the free floating type. Fluid under line pressure will seep behind the back face of the seat where it will be arrested by the sealing lip 72 of the back face seal 70. The upstream seat will then be driven downstream in a piston-like manner due to the force exerted by the lading against the surface area at the back face of the seat to establish a tight seal between the face seal portion 64 of the seat 52 and the plug 22. Since the plug member 22 is in its closed position (FIGURE 9) and since the plug does not move downstream, the downstream seat member (right) will be in the position described above in regard to FIGURE 7 with the face seal lips 67 and 68 lightly engaging the surface 84 of the plug and the back face sealing lip 72 lightly engaging the walls 62 and 74 of the recess because there will be little or no pressure downstream of the plug when the valve is closed. When employing a trunnioned plug valve, there will be no problem of excessive body pressure in the chamber 24. The downstream seat 52 being in light sealing engagement is easily pressure actuated away from the plug 22 to allow any pressure build-up to escape past the lips 67 and 68 to the downstream line.

As described above, it is obvious that valve seats in accordance with this invention may be employed to control a wide variety of pressure conditions as well as being employed effectively with both trunnioned and free floating plug valves.

When a floating plug type valve is employed, utilizing seat members in accordance with this invention, the seat members may be checked for leakage while the valve is in the line without opening the valve body to expose the seats. This type of inspection is known as block-and-bleed service in the valve industry. With the valve in its closed position (FIGURE 8) pressure in the valve chamber is bled to the atmosphere. If the seats are establishing a proper seal, there will be a limited amount of fluid flow from the body bleed port 81 (FIGURE 1) and then the flow will cease. If one or both of the seats are not sealing properly, flow from the body will continue and the valve must be repaired or replaced.

From the foregoing, it will be seen that this invention is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the appended claims.

As many possible embodiments may be made of the invention without departing from the scope thereof, it is to be understood that all matter herein set forth or shown in the accompanying drawings is to be interpreted as illustrative and not in a limiting sense.

I claim:
1. A plug valve comprising a valve body, closure members fixed to said body and defining with said body a valve chamber, a passage formed in each of said closure members and intersecting said valve chamber, plug means positioned within said valve chamber and movable from a position blocking to a position permitting flow of fluid through said flow passages, means for moving said plug means, seat retaining means formed in said closure members, seat means movably positioned within said seat retaining means, said seat means comprising relatively rigid support means having a resilient face sealing means fixed thereto, said face sealing means being engageable with said plug means at low pressure conditions to establish a plurality of relatively small sealing areas therewith, said seat means arranged to establish a single large area of sealing contact with said plug means at high pressure conditions.

2. A plug valve comprising a valve body, closure members fixed to said body and defining with said body a valve chamber, a flow passage formed in each of said closure members and intersecting said valve chamber, spherical plug means positioned within said valve chamber and rotatable from a position blocking to a position permitting flow of fluid through said flow passages, means for rotating said plug means, seat retaining means formed in said closure members, seat means movably positioned within said seat retaining means, said seat means comprising an annular relatively rigid support member, an annular resilient face sealing means fixed to said support member and being engageable with said plug means at low pressure conditions to establish a plurality of relatively small annular concentric sealing areas therewith, said seat means arranged to establish a single large annular area of sealing contact with said plug means at high pressure conditions.

3. A plug valve comprising a valve body, closure members fixed to said body and defining with said body a valve chamber, a flow passage formed in each of said closure members and intersecting said valve chamber, spherical plug means positioned within said valve chamber and rotatable from a position blocking to a position permitting flow of fluid through said flow passages, means for rotating said plug means, seat retaining means formed in said closure members, seat means movably positioned within said seat retaining means, said seat means comprising an annular relatively rigid plastic support portion, an annular resilient face sealing portion fixed to said rigid support portion, said face sealing portion including a plurality of annular spaced coaxial thin sealing lip portions, enclosing a depressed surface, said lip portions contacting said plug means and defining at low valve pressure a plurality of relatively small sealing areas of contact therewith and at high pressures defining a single relatively large area of sealing contact with said plug means.

4. A plug valve comprising a generally annular valve body closure members fixed to either side of said valve body and defining therewith a valve chamber, flow passages formed in said closure members and intersecting said valve chamber, a plug member positioned for rotation within said valve chamber, said plug member formed with a through passage alignable with said flow passages to form the run of the valve, means for rotating said plug member, an annular recess formed in each of said closure members about said flow passages, an annular seat member movably positioned within each of said recesses and having a face seal portion thereof in sealing engagement with said plug member, each of said seat members comprising a relatively rigid annular plastic support member, a resilient face sealing portion fixed to said support member and having a plurality of spaced annular areas of sealing contact with said plug member at low line pressure conditions, said face sealing portion being deformable by said plug member to define a single annular area of sealing contact with the plug member at high line pressure conditions.

5. A plug valve comprising a generally annular valve body, closure members fixed to either side of said valve body and defining therewith a valve chamber, flow passages formed in said closure members and intersecting said valve chamber, a plug member positioned for rotation within said valve chamber, said plug member formed with a through passage alignable with said flow passages to form the run of the valve, means for rotating said plug member, an annular recess formed in each of said closure members about said flow passages, an annular seat member movably positioned within each of said recesses and having face seal members in sealing engagement with said plug member, each of said seat members comprising a relatively rigid annular plastic support member, a resilient face sealing portion fixed to said support member, a plurality of annular coaxial spaced sealing lip portions enclosing a depressed surface, said sealing lip portions being integral with said face sealing member and positioned to engage said plug member at a plurality of annular areas to establish sealing contact with said plug member at low line pressure conditions said sealing lip portions arranged to deform to establish a single annular area of sealing contact with the plug member at high line pressure conditions.

6. A plug valve comprising a generally annular valve body, closure members fixed to either side of said valve body and defining therewith a valve chamber, flow passages formed in said closure member and intersecting said valve chamber, a spherical plug member positioned for rotation within said valve chamber, said plug member formed with a through passage alignable with said flow passages to form the run of the valve, stem means for rotating said plug member, an annular recess formed in each of said closure members about said flow passages, an annular seat member movably positioned within each of said recesses and having a face seal portion thereof in sealing engagement with said plug member, each of said seat members comprising a relatively rigid annular support portion, a resilient face sealing portion fixed to said support portion, coaxial annular sealing lip portions integral with said face sealing portion and enclosing a depressed surface, said lip portions positioned to engage said plug member about said through passage to establish two small annular areas of sealing contact at low valve pressure conditions and being deformable under high line pressure conditions to establish a single annular areas of sealing contact with said plug member about said through passage.

7. A valve seat for a valve having a rotatable plug member and seat retaining groove means, said seat comprising an annular support member of relatively rigid plastic material, an annular groove formed in said support member, an annular resilient back face sealing portion fixed to said annular support member within said groove, an annular pressure actuatable yieldable sealing means integral with said back face sealing portion and having a sealing lip portion thereof extending axially and radially beyond said support member for sealing engagement with the walls of said seat retaining groove, said back face sealing portion having axial and radial depressions of greater volume than the volume of said axially and radially extending sealing lip portion, such that said lip portion may be confined within the volume of said annular groove.

8. In a rotary plug valve having rotatable plug means and seat retaining recess means, a seat member comprising a rigid support portion mounted to be movably retained within said recess means, a resilient face sealing portion fixed to one axial end of said support portion and positioned for sealing engagement with said plug means, said face sealing portion comprising a plurality of integral coaxial spaced sealing lips enclosing a depressed surface, said sealing lips positioned to engage said plug means to establish two relatively small concentric circular areas of sealing contact with said plug member at low pressure valve conditions and to establish a single area of sealing contact with said plug means at high pressure conditions, said single area of contact being larger than said relatively small areas of sealing contact combined, an annular groove formed in the other axial end of said support portion, and a resilient back face sealing portion fixed to said support portion within said annular groove and having integral pressure actuatable yieldable sealing means extending radially and axially beyond said support portion for sealing engagement with the walls of said recess means.

9. A plug valve comprising a valve body, closure members fixed to said body and defining, with said body, a valve chamber, a spherical plug member having a through passage formed therein positioned for rotational movement within said valve chamber, a cam surface defined on said plug member at the intersection of the spherical surface of the plug member and the through passage, seat members positioned within said valve chamber and being normally in sealing engagement with said plug member, each of said seat members comprising a relatively rigid annular portion, a soft elastomer face sealing portion fixed to one axial end of said rigid annular portion, said face sealing portion including two radially spaced integral coaxial lip portions enclosing a depressed surface, each of said lip portions being in light sealing engagement with said plug member at low line pressures thus defining two coaxial annular areas of sealing contact with the plug member, said sealing lip portions arranged to be deformed under high line pressures to establish with said depressed surface a single annular area of sealing contact with the surface of the plug, said lip portions being contacted and moved axially by said cam surface upon rotation of said plug member.

10. In a rotary plug valve as set forth in claim 8, said resilient back face sealing portion having axial and radial depressions of greater volume than the volume of said axially and radially extending sealing means, such that said sealing means may be confined within the volume of said annular groove.

References Cited

UNITED STATES PATENTS

| | | | |
|---|---|---|---|
| 2,652,849 | 9/1953 | Ebbs | 251—368 X |
| 2,858,098 | 10/1958 | Sanctuary | 251—317 X |
| 2,963,263 | 12/1960 | Sanctuary | 251—315 X |
| 2,969,218 | 1/1961 | Shaw | 251—368 X |
| 2,985,421 | 5/1961 | Anderson | 251—172 |
| 3,030,068 | 4/1962 | Priese | 251—162 X |
| 3,131,906 | 5/1964 | King | 251—317 X |
| 3,132,837 | 5/1964 | Britton | 251—309 X |

FOREIGN PATENTS 907,621  10/1962  Great Britain.

WILLIAM F. O'DEA, *Primary Examiner.*

ISADOR WEIL, *Examiner.*

H. WEAKLEY, *Assistant Examiner.*